United States Patent [19]
Minnema

[11] Patent Number: 5,878,971
[45] Date of Patent: Mar. 9, 1999

[54] PERFORATED TAB AND TABBED TAPE ROLLS

[75] Inventor: Peter S. Minnema, Perth, Canada

[73] Assignee: Minnesota Mining and Manufacturing Company, St. Paul, Minn.

[21] Appl. No.: 861,444

[22] Filed: May 22, 1997

[51] Int. Cl.⁶ ..................................... B65H 18/28
[52] U.S. Cl. .......................... 242/160.4; 242/580; 242/582
[58] Field of Search .............................. 242/160.1, 160.4, 242/580, 582

[56] References Cited

U.S. PATENT DOCUMENTS

| | | |
|---|---|---|
| 2,015,268 | 9/1935 | Hammond . |
| 2,329,527 | 9/1943 | Golub . |
| 3,920,016 | 11/1975 | Mesek et al. . |
| 3,967,624 | 7/1976 | Milnamow . |
| 4,512,462 | 4/1985 | Dills . |

FOREIGN PATENT DOCUMENTS 659 615   1/1951   United Kingdom .

Primary Examiner—Donald P. Walsh
Assistant Examiner—William A. Rivera
Attorney, Agent, or Firm—Charles D. Levine

[57] ABSTRACT

A tab for placement on one end of a length of tape has at least one perforation. The tape can have a first end, a second end, a first side, and a second side. Adhesive is on the first side, and the tab is located at the first end of the tape and adhered to the first side of the tape. The tab has at least one perforation such that when the tape is wound into a roll, the adhesive accessible through the perforation adheres the tab to the tape to prevent the tab from protruding from the roll while permitting the tab to be grabbed easily to begin unwinding the roll of tape.

10 Claims, 1 Drawing Sheet

PERFORATED TAB AND TABBED TAPE ROLLS

TECHNICAL FIELD

The present invention relates to tape rolls. More particularly, the present invention relates to tape rolls with starter tabs.

BACKGROUND OF THE INVENTION

Webs, such as adhesive tapes, are typically formed into rolls for dispensing as well as during the manufacture and conversion of the product. The tape is wound on itself and the last wrap of tape adheres to the underlying wrap, making it difficult to start unwinding the tape from the roll. It is well known to place a tab on the end of the tape, across the adhesive portion of the tape, to deaden that portion and provide a free end that does not adhere to the underlying wrap. This makes it easier to start unwrapping the tape from the roll. Such tabs can be about 2.54 cm (1.0 in) long and span the entire width of the tape.

In converting, a jumbo of tape is slit to provide finished product rolls. A tab is used as the beginning of a roll and facilitates the initial unwind. With filament tapes, for example, the tape is packaged using an automated system in which stacks of finished tape rolls are placed in a plastic sleeve and are shrink wrapped. Often the tabbed portion of tape hinders packaging because it protrudes from the roll. One known solution to this problem is to "overtab." Overtabbing involves allowing a portion of non-tabbed tape to extend beyond the tab. This portion of non-tabbed tape adheres to the roll, preventing the tab from protruding. However, this inhibits the initial unwind of the tape and is not significantly better than a roll without any tab.

U.S. Pat. No. 3,967,624 discloses an adhesive tab for diapers that has a removable perforated cover that is removed for use. This tab is not intended for use with rolls of tape and is not located at the end of a roll.

There is a need for a tab and a tabbed roll that is easy to initially unwind and in which the tab does not protrude from the roll.

SUMMARY OF THE INVENTION

A tab for placement on one end of a length of tape has at least one perforation. The tab can have a series of circular perforations. Each perforation diameter can range from 0.1 cm to 1.0 cm. The series of circular perforations can be formed in two rows that extend for substantially the entire tab width.

A tape can have a first end, a second end, a first side, and a second side. Adhesive is on the first side, and a tab is located at the first end of the tape and adhered to the first side of the tape. The tab has at least one perforation such that when the tape is wound into a roll with the first end of the tape on the outermost portion of the roll, the adhesive accessible through the perforation adheres the tab to the tape to prevent the tab from protruding from the roll while permitting the tab to be grabbed easily to begin unwinding the roll of tape.

DETAILED DESCRIPTION

Figure 1:
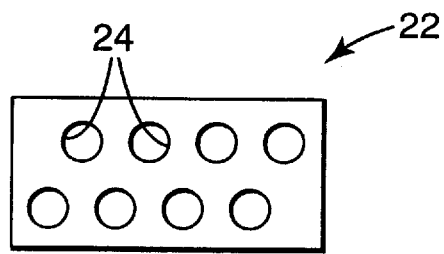
FIG. 1 is a top view of a tab of the invention.
Figure 2:
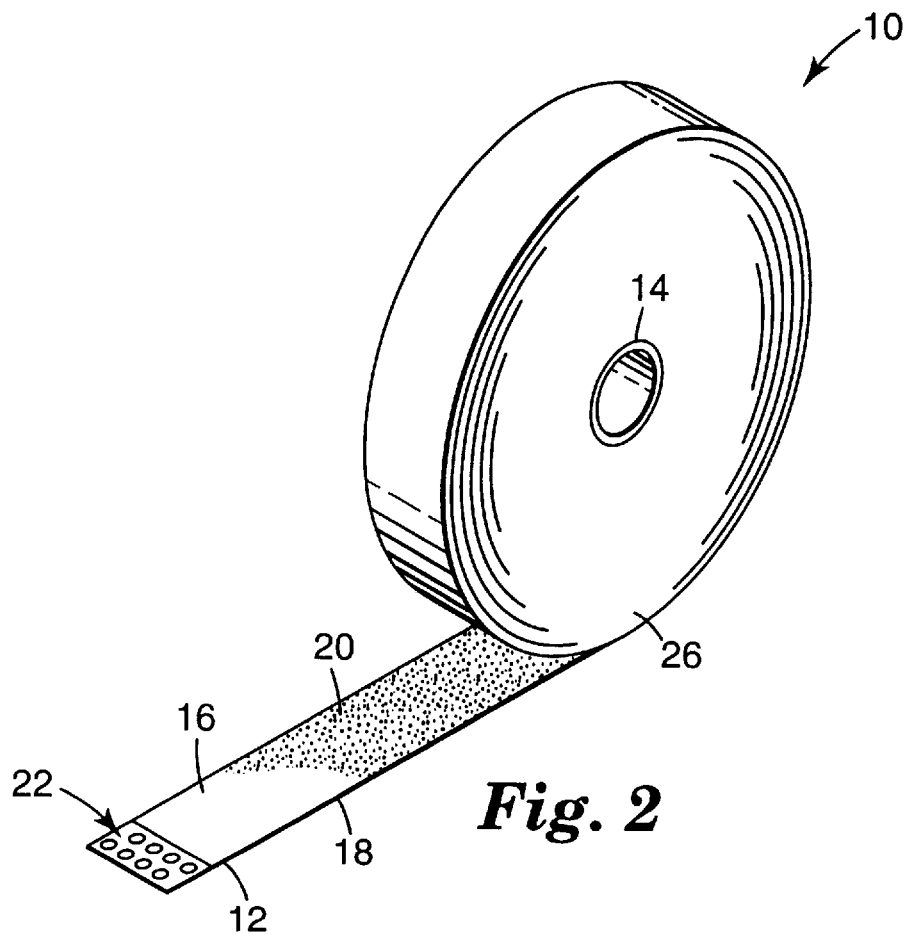
FIG. 2 is a perspective view of a tabbed tape of the invention.

The present invention is a tab and a tape (or other web) having a tab. The tab is placed on one end of a length of tape to facilitate the initial unwinding of the tape from the roll. The tab has at least one perforation which prevents the tab from protruding from the roll. As shown in FIG. 1, the tab can have a series of circular perforations. These circular perforations can be formed in one or more rows. Perforations can also be other shapes and patterns.

The tape 10 has a first end 12, a second end 14, a first side 16, and a second side 18. Adhesive 20 is placed on the first side 16 of the tape 10. Thus, the tape 10 can be a type of adhesive tape, such as filament tape, masking tape, household tape, and transparent tape. The tab 22 is located at the first end 12 and is adhered to the first side 16 of the tape 10. The tab 22 has at least one hole or perforation 24 such that when the tape 10 is wound into a roll 26 with the first end 12 of the tape 10 on the outermost portion of the roll 26, the adhesive 20 accessible through the perforations 24 of the tab 22 adheres the tab to the tape. This prevents the tab 22 from protruding from the roll 26 while permitting the tab 22 to be grabbed easily to begin unwinding the roll of tape.

The tab 22 can have a width equal to the width of the tape 10. The length of the tab 22 can be about 2.54 cm (1.0 in), which is generally less than 1% of the length of the tape 10. In some embodiments, the tab 22 can be longer than 2.54 cm (1 in). After the tab 22 is placed on the tape 10 it is not intended to be removable from the tape portion to which it adheres. (During the subsequent use of the tape, whether as a final product or in further conversion, the tab with the tape portion are removed together, but the tab is not removed from the underlying tape portion.)

In one embodiment, about a maximum of 50% of the tab 22 is perforated. The tab can be made in a roll 2.54 cm (1.0 in) wide and 823 m (2700 ft) long. The perforations 24 can be 1.2 cm (0.5 in) wide for the entire length. Smaller hole sizes, such as diameters of 0.476 cm (0.1875 in) also can be used, and diameters ranging from 0.1 cm (0.04 in) to 1.5 cm (0.6 in) can be used. In one application, the perforations 24 are spaced such that there is at least one perforation every 0.9 cm (0.35 in) (center-to-center spacing), with the perforations spaced at least 0.159 cm (0.0625 in) from the free end of the tab and from adjacent rows. The perforations 24 can be located on only the half of the tab adjacent the free end of the tab while the remaining half of the tab has no perforations. This spacing corresponds to the minimum width tape handled in a specific plant location, ensuring that no matter on which width tape the tab roll is used, there will be at least one perforation. The tab 22 is mounted on the tape roll 26, in one embodiment, by placing the tab roll along the crossweb direction of the tape roll.

It is believed that multiple holes 24 on each tab 22 are better than only one hole. However, there is believed to be a point in which there are too many holes 24 or too much space through which the adhesive 20 can operate.

For filament tape, the backing, filaments, and adhesive layer are very thick so a larger diameter hole is needed. With filament tape, the holes should not be located across the entire tab or the tab would not be strong enough to be applied to the width of the tape without breaking.

Tabs 22 according to this invention will not hinder the automated packaging process used to package multiple rolls 26 of filament tape. The packaging line therefore will be less likely to be interrupted for problems with inserting multiple rolls of tape into sleeves caused by protruding tabs. Productivity should increase, yielding cost savings. Additionally, all finished tape rolls will be more aesthetically pleasing because the tab will not protrude from the tape roll.

Various changes and modifications can be made in the invention without departing from the scope or spirit of the invention. For example, the perforated tab 22 can be used with any type of adhesive tape 10 or similar web in which it is desired to prevent the tabbed portion of the tape from sticking out from the roll 26 while maintaining the ease of removal of the outer wrap of tape from the roll.

I claim:

1. A package containing at least one roll of tape, the package comprising a tape having a first end and a second end, a first side and a second side, adhesive on the first side, and a non-reusable tab at the first end adhered to the first side of the tape, wherein the tab has at least one perforation such that when the tape is wound into a roll with the first end of the tape on an outermost portion of the roll the adhesive accessible through the at least one perforation adheres the tab to the tape to form a tabbed tape roll and to prevent the tab from protruding from the roll while permitting the tab to be grabbed easily to begin unwinding the roll of tape; and wherein the tabbed tape roll is contained in the package.

2. The package of claim 1 wherein the tab is a single flat sheet adherable to only one side of the tape.

3. The package of claim 2 wherein each perforation has a diameter that ranges from 0.1 cm to 1.0 cm and wherein the series of perforations extends for substantially the entire tab width.

4. The package of claim 1 wherein the tab has a series of circular perforations formed in two rows.

5. The package of claim 1 wherein after the tab is placed on the tape it is not removable from the tape, and wherein the length of the tab is less than 1% of the length of the tape.

6. The package of claim 5 wherein the tab has a width equal to width of the tape.

7. The package of claim 5 wherein the tape is a type of adhesive tape.

8. The package of claim 7 wherein the package contains multiple tape rolls.

9. The package of claim 1 wherein the package is a shrink-wrapped plastic sleeve.

10. The package of claim 1 wherein the package contains multiple tape rolls.

* * * * *